(12) United States Patent
Alric et al.

(10) Patent No.: US 10,100,159 B2
(45) Date of Patent: Oct. 16, 2018

(54) POLYESTER COMPOUNDS HAVING ENHANCED HYDROPHOBIC SURFACE PROPERTIES

(71) Applicant: PolyOne Corporation, Avon Lake, OH (US)

(72) Inventors: Jerome Alric, Champagne sur Oise (FR); Delphine Huart, Montigny les Cormeilles (FR); Andre Habay, Fentange (LU); Jerome Waeler, Saint Martin le Noeud (FR)

(73) Assignee: PolyOne Corporation, Avon Lake, OH (US)

( * ) Notice: Subject to any disclaimer, the term of this patent is extended or adjusted under 35 U.S.C. 154(b) by 180 days.

(21) Appl. No.: 14/900,574

(22) PCT Filed: Jul. 10, 2014

(86) PCT No.: PCT/US2014/046129
§ 371 (c)(1),
(2) Date: Dec. 21, 2015

(87) PCT Pub. No.: WO2015/006547
PCT Pub. Date: Jan. 15, 2015

(65) Prior Publication Data
US 2016/0130411 A1 May 12, 2016

Related U.S. Application Data

(60) Provisional application No. 61/845,585, filed on Jul. 12, 2013.

(51) Int. Cl.
| | | |
|---|---|---|
| *C08J 3/22* | (2006.01) |
| *C08J 5/18* | (2006.01) |
| *B32B 27/08* | (2006.01) |
| *B32B 27/18* | (2006.01) |
| *B32B 27/36* | (2006.01) |
| *C08L 67/02* | (2006.01) |
| *C08L 83/04* | (2006.01) |
| *C08L 83/06* | (2006.01) |
| *C08L 83/08* | (2006.01) |
| *C08K 5/09* | (2006.01) |
| *C08K 5/092* | (2006.01) |
| *C08K 5/1539* | (2006.01) |
| *C08L 67/00* | (2006.01) |
| *D01F 6/84* | (2006.01) |
| *B32B 7/02* | (2006.01) |
| *C08G 77/14* | (2006.01) |

(52) U.S. Cl.
CPC ............. *C08J 3/226* (2013.01); *B32B 27/08* (2013.01); *B32B 27/36* (2013.01); *C08J 3/22* (2013.01); *C08J 5/18* (2013.01); *C08L 67/00* (2013.01); *C08L 67/02* (2013.01); *C08L 83/06* (2013.01); *D01F 6/84* (2013.01); *B32B 7/02* (2013.01); *B32B 27/18* (2013.01); *B32B* *2250/02* (2013.01); *B32B 2250/03* (2013.01); *B32B 2307/73* (2013.01); *B32B 2367/00* (2013.01); *B32B 2419/00* (2013.01); *C08G 77/14* (2013.01); *C08J 2367/00* (2013.01); *C08J 2367/02* (2013.01); *C08J 2367/03* (2013.01); *C08J 2383/04* (2013.01); *C08J 2383/06* (2013.01); *C08J 2383/08* (2013.01); *C08J 2467/03* (2013.01); *C08J 2483/06* (2013.01); *C08K 5/09* (2013.01); *C08K 5/092* (2013.01); *C08K 5/1539* (2013.01); *C08L 83/04* (2013.01); *C08L 83/08* (2013.01); *C08L 2203/12* (2013.01); *C08L 2203/16* (2013.01); *C08L 2205/025* (2013.01); *C08L 2205/05* (2013.01); *C08L 2310/00* (2013.01); *Y10T 428/31786* (2015.04)

(58) Field of Classification Search
None
See application file for complete search history.

(56) References Cited

U.S. PATENT DOCUMENTS

| | | | | | |
|---|---|---|---|---|---|
| 3,553,157 | A | * | 1/1971 | Dijkstra | C08G 18/4205 523/220 |
| 4,613,641 | A | * | 9/1986 | Haubennestel | C08G 77/445 524/265 |
| 4,999,229 | A | * | 3/1991 | Moritani | B32B 27/08 428/36.6 |
| 5,254,654 | A | * | 10/1993 | Buese | C08G 77/045 528/14 |

(Continued)

FOREIGN PATENT DOCUMENTS

| | | | |
|---|---|---|---|
| EP | 2 113 522 A | * | 11/2009 |
| WO | 98/12244 A1 | | 3/1998 |

OTHER PUBLICATIONS

Scheirs: "Additives for the Modification of Poly(Ethylene Terephthalate) to Produce Engineering-Grade Polymers," Modern Polyesters: Chemistry and Technology of Polyesters and Copolyesters, 2003, pp. 495-540.

Xiong et al.: "Hydrophobic Modification of Poly(Ethylene Terephthalate) with Epoxy-Modified Polysiloxane by Reactive Extrusion," Journal of Macromolecular Science, Part B: Physics, 2012, vol. 51, No. 4, pp. 630-641.

*Primary Examiner* — Vivian Chen
(74) *Attorney, Agent, or Firm* — John H. Hornickel

(57) ABSTRACT

A masterbatch having reactive silicone as a hydrophobic additive, the polyester compound that the silicone-containing masterbatch has been let down into, and the plastic articles and films from such compounds having enhanced hydrophobic properties are disclosed. Films having a Water Contact Angle of at least 76° (ASTM D7490-08) are exemplified.

19 Claims, No Drawings

(56) References Cited

U.S. PATENT DOCUMENTS

| | | | |
|---|---|---|---|
| 5,288,764 A * | 2/1994 | Rotter | C08J 9/00 264/54 |
| 5,356,585 A * | 10/1994 | Romenesko | B29C 47/94 264/211 |
| 5,417,867 A * | 5/1995 | Mikami | C08G 63/6954 252/8.61 |
| 5,844,031 A * | 12/1998 | Chen | C08L 83/04 524/264 |
| 5,861,450 A * | 1/1999 | Chen | C08L 23/02 264/331.11 |
| 5,936,021 A | 8/1999 | Bryant et al. | |
| 6,013,217 A * | 1/2000 | Hauenstein | C08K 5/523 264/169 |
| 6,080,489 A | 6/2000 | Mehta | |
| 6,350,822 B1 * | 2/2002 | Van Diepen | C08G 63/20 525/437 |
| 6,447,913 B1 * | 9/2002 | Watanabe | C08K 5/0008 264/331.11 |
| 6,469,078 B1 * | 10/2002 | Simon | C08G 63/914 521/48 |
| 6,500,549 B1 * | 12/2002 | Deppisch | A61L 29/085 428/411.1 |
| 6,590,032 B2 * | 7/2003 | Furukawa | C08L 23/02 524/506 |
| 7,947,777 B2 | 5/2011 | Haubennestel et al. | |
| 8,722,761 B2 * | 5/2014 | Subramanian | B29C 47/0004 523/122 |
| 2004/0138381 A1 * | 7/2004 | Blasius, Jr. | C08F 220/32 525/131 |
| 2004/0147678 A1 * | 7/2004 | Blasius, Jr. | C08J 3/226 525/208 |
| 2006/0073317 A1 * | 4/2006 | Sato | B32B 27/36 428/212 |
| 2006/0293416 A1 * | 12/2006 | Peeters | C08J 3/226 523/351 |
| 2008/0161468 A1 * | 7/2008 | Juikar | C08F 14/18 524/423 |
| 2008/0242783 A1 * | 10/2008 | Ganesan | C08G 63/19 524/413 |
| 2008/0242784 A1 * | 10/2008 | Ganesan | C08G 63/19 524/413 |
| 2010/0120947 A1 * | 5/2010 | Kuhmann | C08J 5/18 523/400 |
| 2010/0292352 A1 * | 11/2010 | Li | C08J 3/226 521/48 |
| 2010/0311849 A1 * | 12/2010 | Gonzalez Montiel | C08F 293/005 521/48 |
| 2011/0172319 A1 * | 7/2011 | Li | B29C 44/3461 521/57 |
| 2012/0184678 A1 * | 7/2012 | Deeter | C08F 2/38 525/176 |
| 2015/0203643 A1 * | 7/2015 | Alric | C08J 5/18 428/339 |
| 2015/0203673 A1 * | 7/2015 | Alric | C08J 5/18 428/339 |

* cited by examiner

POLYESTER COMPOUNDS HAVING ENHANCED HYDROPHOBIC SURFACE PROPERTIES

CLAIM OF PRIORITY

This application claims priority from U.S. Provisional Patent Application Ser. No. 61/845,585 and filed on Jul. 12, 2013, which is incorporated by reference.

FIELD OF THE INVENTION

This invention relates to masterbatches containing reactive silicone ingredients to serve as hydrophobic additives for polyester thermoplastic compounds.

BACKGROUND OF THE INVENTION

Plastic has taken the place of other materials in a variety of industries. Because plastic can be engineered to not shatter, rust or rot, plastic articles have replaced glass, metal and wood articles in many applications. For example, in the food and packaging industries, plastic has replaced glass to minimize breakage, reduce weight, and reduce energy consumed in manufacturing and transport.

Additives are often added to a plastic to facilitate the processing or performance of that material. Commonly used additives are slip agents, which act as an internal lubricant for the polymer during processing. For instance in film processing, slip additives lessen friction between the polymer film and high speed processing and packaging equipment.

Slip additives often function by migrating (i.e., "blooming") to the surface of the polymer, where they provide a coating that reduces the surface's coefficient of friction. Because the additive is concentrated at the surface where it is needed for processing, less slip additive is required in the polymer material overall.

Contrariwise, other additives can alter the surface of the polymer to make hydrophobic an otherwise hydrophilic polymer surface. Xiong et al. report in "Hydrophobic Modification of Poly(Ethylene Terephthalate) with Epoxy-Modified Polysiloxane by Reactive Extrusion" published in *Journal of Macromolecular Science, Part B: Physics* (630-641, February 2012) that hydrophobicity of the polyester (polyethylene terephthalate or PET) surface with an increase in water contact angle, even after solvent washing of the surface. But also, Xiang et al. reported that the surfaces of the hydrophobic-modified PET films to be rougher than unmodified PET, an unacceptable result for industrial production of PET films.

SUMMARY OF THE INVENTION

What the art needs is an additive to effectively and continuously provide hydrophobic surfaces for polyester-based compounds that is non-migratory, has improved anti-graffiti properties compared to polyester compounds without the hydrophobic additives, and exhibits good stability over time.

This invention solves those problems by the chemical modification of polyesters via the incorporation of polydimethylsiloxane (commonly called "silicone") blocks in the polymer backbone. The resulting products show hydrophobic property resulting in significant decrease of surface energy and increase of the water contact angle of surfaces of the polyester compound. For example, films or sheets containing the modified polyester can be used for anti-graffiti applications, e.g., in building construction, advertisement and communication panels, and railways applications. The material can be also used for the manufacturing of novel water repellant fibers for textile application for instance. It can be also used to increase barrier properties (water, carbon dioxide) in lightweight containers.

The chemical modification process of grafting of silicone blocks on to the polymer backbone is performed in continuous compounding equipment such as a twin screw extruder or continuous kneader. The process is based on the melt functionalization of the polyester by telechelic functionalized silicone oil such as epoxy silicone or carbinol silicone.

Additionally a chain extender additive such as pyromellitic dianhydride (PMDA) or Bis(2,4-ditert-butylphenyl) pentaerytritol diphosphite (commercially available as Irgafos™ 126 from BASF, formerly Ciba Geigy), styrene methyl methacrylate glycidyl methacrylate terpolymer (Joncryl™ from BASF) can be used, in order to increase the level of—incorporation of silicone blocks and to increase the intrinsic viscosity of the polyester. In addition to the chain extender additive, a catalyst can be used in order to boost the incorporation of the reactive silicone blocks as grafts on to the polyester backbone.

The composition is formed by at least 80% wt. of polyester chosen among other polyesters, PET (homopolymer and random copolymers made of terephthalate and isophthalate units), PETG, PLA, PBAT, PBS, PBT, PCT, PEN and their mixtures, from 2% to 20% wt. of functionalized polydimethyl siloxane with a number of repeating units greater than 20, the functional group being chosen among alkoxysilane, silanol, carbinol or epoxy, and optionally from 0.5% to 2% of chain extension additive such as PMDA, Bis(2,4-ditert-butylphenyl)pentaerytritol diphosphite, or styrene methyl methacrylate glycidyl methacrylate terpolymer.

In one embodiment of the invention is a masterbatch for polyester, comprising: (a) polyester carrier; (b) α,ω-difunctional polydimethylsiloxane; (c) a chain extender selected from the group consisting of pyromellitic dianhydride, Bis(2,4-ditert-butylphenyl)pentaerytritol diphosphite, styrene methyl methacrylate glycidyl methacrylate terpolymer, and combinations thereof; and (d) optionally, other additives comprising a catalyst. In one embodiment of the invention, the masterbatch described above is let down into a polyester resin.

Another embodiment of the invention is a plastic article produced from the polyester compound or directly from the masterbatch mixed with the polyester resin at the final shaping equipment, such as a molding machine. The article may be shaped from injection molding, blown or cast film extrusion, or calendered or thermoformed sheets.

Another embodiment of the invention is a film produced from the polyester compound. The film may include other layers having the same or different ingredients forming a laminate. The laminate may be a coextruded multilayer structure. The laminate may have a core layer and a skin layer contacting the surface of the core layer.

The following embodiments explain some attributes of the invention.

EMBODIMENTS OF THE INVENTION

Polyester

Any thermoplastic polyester is a candidate for use in this invention, whether bio-based or petroleum synthesized, whether virginal or post-consumer recycled, and whether aromatic or aliphatic.

Non-limiting examples of polyester are polyethylene terephthalate (PET), Polycyclohexylenedimethylene terephthalate (PCT), polyethylene naphthalate (PEN), polybutylene terephthalate (PBT), polyethylene terephthalate glycol-modified (PETG), polylactic acid (PLA), Poly(butylene adipate-co-terphthalate) (PBAT), polyhydroxyalkanoates (PHA) including polyhydroxybutyrate-co-valerate (PHBV) and polyhydroxybutyrate (PHB), and Polybutylene succinate (PBS).

Reactive Silicone

The chemical which imparts hydrophobicity to the polyester resin is a reactive silicone. Currently, two reactive silicones, but there is no limit to the possibility that a person having skill in the art, without undue experimentation, could identify other reactive silicones which are commercially available to be useful as the hydrophobic additive for this invention.

While not limited to a particular theory, it is believe that the silicone with reactive groups reacts with the polyester macromolecular end chains with the result that a chemically modified polyester is formed having increased hydrophobicity. While polyester is inherently hydrophobic, the amount of that hydrophobicity alone is not sufficient to provide the amount of hydrophobicity required to withstand graffiti marking and other soiling of the polyester surface. The present invention provides at least about 30 percent increase in the hydrophobicity of the surface of a shaped plastic article having a polyester surface, as shown in the Examples below when comparing Water Contact Angle (ASTM D7490-08) of polyester alone and polyester compounds of the invention, both made into films.

Non-limiting examples of reactive silicones are epoxy-functional siloxanes and carbinol-functional siloxanes. The size of the polydimethylsiloxane macromolecule is measured by the number of repeating dimethylsiloxane units, with 20-30 being useful. The problem with polydimethylsiloxane is that, while increasing unit count enhances hydrophobicity, much more than n=30 also causes an unacceptable increase in viscosity which adversely affects polymer processing. For that reason, the end-group functionality on the polydimethylsiloxane macromolecule is far more useful for this invention.

Of the candidate epoxy-functional siloxanes, $\alpha,\bar{\omega}$-epoxy difunctional polydimethylsiloxane is presently preferred, commercially available as TEGOMER E-Si 2330 brand silicone from Evonik. As other epoxy-functional siloxanes become known to persons having ordinary skill in the art, they will also be candidates for use, without undue experimentation.

Of the candidate carbinol-functional siloxanes, $\alpha,\bar{\omega}$-carbinol difunctional polydimethylsiloxane is presently preferred, commercially available as BAYSILONE Fluid OF OH 702E brand silicone from Momentive Silicone. As other carbinol-functional siloxanes become known to persons having ordinary skill in the art, they will also be candidates for use, without undue experimentation.

Chain Extenders

A chain extender is needed to assist the reaction of the silicone with the polyester. Candidate chain extenders are pyromellitic dianhydride Bis(2,4-ditert-butylphenyl)pentaerytritol diphosphite (Irgafos 126, BASF), styrene methyl methacrylate glycidyl methacrylate terpolymer (Joncryl, BASF), and combinations thereof. Preferably, pyromellitic dianhydride (PMDA) is used, commercially available from a number of vendors, including Lonza.

Optional Additives

The polymer compounds of the present invention can include any conventional plastics additives in any combination that would not deleteriously affect the slip properties of the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; antioxidants; biocides (antibacterials, fungicides, and mildewcides), anti-fogging agents; anti-static agents; bonding, blowing and foaming agents; dispersants; fillers and extenders; smoke suppressants; expandable char formers; impact modifiers; initiators; lubricants; micas; pigments, colorants and dyes; plasticizers; processing aids; other polymers; release agents; silanes, titanates and zirconates; additional slip agents; anti-blocking agents; stabilizers; stearates; ultraviolet light absorbers; viscosity regulators; waxes; barrier additives and combinations of them.

In particular, two additives can assist the reaction of the reactive silicone with the polyester. One additive is a transesterification catalyst to assist the reaction of the $\alpha,\bar{\omega}$-carbinol difunctional polydimethylsiloxane with the polyester. Candidates include stannates, titanates, zirconates, or metal stearates. Preferably that catalyst is cobalt stearate, commercially available from several vendors, including STECCO HV90 brand cobalt stearate from Shepherd.

For convenience during processing and handling, the reaction of the silicone hydrophobic additive with the polyester can be made into a masterbatch formulation, which is afterward let down into the polyester resin that is made into a film or other article to impart enhanced hydrophobicity, at least about 30% as measured using Water Contact Angle (ASTM D7490-08), to the entire polyester compound at its formed surfaces. To have the highest concentration of hydrophobic polyester as additive, as required for example in release film applications, the masterbatch can also be processed into the polyester film directly.

Table 1 shows the acceptable, desirable, and preferable ranges of ingredients for the masterbatch mixture. The masterbatch of the invention can comprise, consist essentially of, or consist of these ingredients in these amounts.

TABLE 1

Ranges of Ingredients for the Masterbatch Mixture

| Ingredient (Wt. Percent) | Acceptable | Desirable | Preferable |
|---|---|---|---|
| Polyester Carrier | 80%-99% | 85%-97% | 88%-92% |
| Reactive Silicone | 1%-20% | 3%-15% | 8%-12% |
| Optional catalyst | 0.1%-2% | 0.25%-1.5% | 0.5%-1% |
| Chain extender | 0.25%-2% | 0.5%-1.5% | 0.5%-1% |
| Other optional additives | 0%-10% | 0%-10% | 0%-10% |

The masterbatch of the present invention may be added to the hydrophilic polyester resin in an amount ranging from about 5% to about 100%, and preferably from about 10% to about 30% weight percent of the polyester compound. The polyester compound can include one or more masterbatches containing different additives beneficial for the application of the final plastic article. To minimize migration of excess silicone hydrophobic additive, the stoichiometry between the functionalized polydimethylsiloxane and polyester in the masterbatch is preferably a ratio in which there is sufficient polyester and chain extender to react with all of the polydimethylsiloxane in the masterbatch to make a hydrophobic polyester with no remaining unreacted polydimethylsiloxane.

Processing

Masterbatch Production

The preparation of the masterbatches of the present invention is uncomplicated. The masterbatches of the present invention can be made in continuous or batch operations.

Mixing in a continuous process typically occurs in an extruder that is elevated to a temperature that is sufficient to melt the polyester resin matrix with addition either at the head of the extruder or downstream in the extruder of the solid or liquid ingredient additives. Specific melt mixing equipments suitable for the manufacture of the said masterbatch include, co-rotating twin screw extruder, multiple screw extruder or co-kneader. Preferably the melt mixing equipment used is a twin screw co-rotating extruder equipped with screws having a length to diameter (L/D) ratio of at least 32. Extruder speeds can range from about 50 to about 600 revolutions per minute (rpm).

Processing conditions to be applied during mixing in a continuous process are dependent of the polymer carrier used. In the present case where the polymeric carrier is PET, the processing temperatures are in the range of 240° C. to 320° C.

Typically, the output from the extruder is pelletized into standard size pellets, or may also be cut by an underwater pelletizer or water-ring pelletizer to create beads. The pellets or beads are used for later extrusion or molding into polymeric articles.

To ensure constant and homogeneous quality of the masterbatch, the ingredients are preferably dosed in a twin screw extruder with gravimetric dosing units. The polymer carrier is added in the extruder via the main hopper and additives are either added via the main hopper or are incorporated into the polymer via a side feeder and liquid injection.

Mixing in a batch process typically occurs in a Banbury mixer that is capable of operating at a temperature that is sufficient to melt the polyester resin to permit addition of the solid or liquid ingredient additives. The mixing speeds range from 60 to 1000 rpm. The output from the mixer is chopped into smaller sizes for later extrusion or molding into polymeric articles.

Masterbatch concentrates can be later let down into a polyester matrix to produce the polyester compound, which can be injection molded, extruded, calendered, blow molded or thermoformed into plastic articles. The rate of let-down can range from 10 to 70 weight percent, as demonstrated by the Inventive Masterbatch examples below.

Film Extrusion

Subsequent extrusion or molding techniques of the final compound of the present invention to form polymer films or other articles are well known to those skilled in the art of thermoplastics polymer engineering. Without undue experimentation but with such references as "Extrusion, The Definitive Processing Guide and Handbook" published by Plastics Design Library (www.elsevier.com), one can use different techniques for making articles using the compound of the present invention.

Polyester films can be formed, for example, from an extruded melt that is blown or cast or even cast and quenched, either onto a drum, a belt, in water, or the like. Cast polyester films may be subsequently oriented, either uniaxially or biaxially, using conventional equipment such as drawing on heated rollers or using a tenter-frame, or combination thereof.

Usefulness of the Invention

The present invention may be used in numerous applications that would benefit from materials having hydrophobic surface properties. For example, the present invention may be desirable to resist the marking of graffiti on the surface the polyester compound or film, because of the hydrophobicity of the surface imparted by the addition of the masterbatch of the invention.

The present invention may also provide hydrophobic properties for better handling of films and other articles, including cast and biaxially-oriented films.

In addition, prolonged hydrophobic performance may be desirable in certain packaging applications, including packaging rolls, packaging bags, pouches, sheets, trays, carton liners, wrappers, screen printing films, lamination film, labels, adhesives, stretch and shrink wraps, and photographic materials.

The present invention can also be useful in release film applications as an alternative to silicone coated polyester films, which require the costly step of curing the silicone coating on the polyester skin.

A film can have at least one layer comprised of any of the polyester compound formulations described above. Also, one can form a laminate of more than one film layer or coextrusion of more than one layer, wherein each film layer comprises same or different ingredients. The laminate or coextruded film can include a skin layer contacting one surface of a core layer also having an opposing surface; and wherein the skin layer has a thickness between about 0.0005 millimeter and about 1 millimeter. The laminate or coextruded film can also include a second skin layer contacting the opposing surface of the core layer, wherein the core layer comprises unmodified polyester resin (without the masterbatch) or another polymer.

Another shaped plastic article form is a fiber having hydrophobicity at the curved surface of the fiber to impart resistance to soiling from hydrophilic agents. Diameters of fiber can usually range from about 10 µm to about 50 µm.

EXAMPLES

Table 2 shows a list of ingredients for the Comparative Masterbatches, Inventive Masterbatches, Comparative Films, and Inventive Films. Table 3 shows the recipes and processing conditions for Masterbatches (MBs) MB1-MB7. Table 4 shows the recipes and processing conditions for Films 1-5.

Tests Descriptions

Intrinsic Viscosity was measured according to ASTM D4603. This test method is for the determination of the inherent viscosity of poly(ethylene terephthalate) (PET) soluble at 0.50% concentration in a 60/40 phenol/1,1,2,2-tetrachloroethane solution by means of a glass capillary viscometer.

Surface Energy was evaluated by means of test inks. The test inks are fluids of defined surface tension. The surface energy of a substrate is checked by simply applying the test ink to the surface. The accuracy of the measurement is 1 mN/m. The test inks are available in a range from 18.4 to 105 mN/m at almost any value. The standard range is in between 28 and 56 mN/m.

Water Contact Angle was determined according to ASTM D7490-08: Standard Test Method for Measurement of the Surface Tension of Solid Coatings, Substrates and Pigments using Contact Angle Measurements. The method described in this standard is based on the concept that the total free energy at a surface is the sum of contributions from different intermolecular forces, such as dispersion, polar and hydrogen bonding. This method uses contact angles of two liquids to provide data for the calculation of two components, dispersion, γsd, and polar, γsp. Dispersion and polar component data, along with the total solid surface tension, are useful for explaining or predicting wetting or adhesion, or both, of coatings on pretreatments, substrates and other coatings.

Anti-graffiti Test was an in-house test developed with erasable pens used for white dashboard as follows: A mark was performed on the PET film with the pen. After ink drying for 24 h, the mark was wiped manually. If the mark was erased, the test was positive (OK). If the mark was still visible, the test was negative (NOK). Anti-graffiti performance was also tested on film according to NF F31-112 which has been designed for railways applications Aerosol black paint was applied on the film. After 48 h paint drying the graffiti was examined and then erased by mean of an organic solvent (ethyl acetate). After graffiti removal, a second graffiti was applied and then removed 48 h later with the same solvent.

TABLE 2

Source of Ingredients

| Ingredient Name | Purpose | Brand Name | Generic Name | Commercial Source |
|---|---|---|---|---|
| Polyester | PET carrier | RAMA PET184 | Polyethylene terephtalate | MITSUBISHI Polyester |
| Reactive silicone | Hydrophobic Additive | TEGOMER E-Si 2330 | α,ω-epoxy difunctionnal polydimethylsiloxane | EVONIK |
| | Hydrophobic Additive | BAYSILONE Fluid OF OH 702E | α,ω-carbinol difunctional polydimethylsiloxane. | MOMENTIVE Silicone |
| Catalyst | Transesterification catalyst for the incorporation of the α,ω-carbinol difunctional polydimethylsiloxane. | STECCO HV90 | Cobalt stearate | SHEPHERD |
| Chain extender | Improve silicone grafting on polyester backbone | PMDA | Pyromellitic dianhydride | LONZA |

TABLE 3

Tests with α,ω-epoxy difunctional polydimethylsiloxane

| Ingredient Name (Wt. %) | MB1 Comparative | MB2 Comparative | MB3 Preparative | MB4 Inventive | MB5 Inventive | MB6 Inventive | MB7 Inventive | Control |
|---|---|---|---|---|---|---|---|---|
| RAMA PET184 | 97 | 95 | 90 | 87.3 | 85.5 | 83.7 | 81 | 100 |
| PMDA | — | — | 10 | — | — | — | — | — |
| MB 3 | — | — | — | 9.7 | 9.5 | 9.3 | 9 | — |
| TEGOMER E-Si 2330 | 3 | 5 | — | 3 | 5 | 7 | 10 | — |
| TOTAL | 100 | 100 | 100 | 100 | 100 | 100 | 100 | 100 |
| Processing | | | | | | | | |
| Mixing Equipment | Twin screw extruder ZE25A * 60D | | | | | | | |
| Mixing Temp. | 30/150/260/280/280/280/280/280/280/280/280/280/280° C. | | | | | | | |
| Mixing Speed | 400 rpm | | | | | | | |
| Order of Addition of Ingredients | Silicone injected in the melt at 20D Vacuum at 52D | | PMDA side fed | Solid Premix Silicone injected in the melt at 20D Atmospheric vent at 52D | | | | — |
| Masterbatch Results | | | | | | | | |
| Form of Product After Mixing | | Not Pelletizable Silicone exudation | Pellet | Pellet | Pellet | Pellet | Pellet | Pellet |
| Intrinsic Viscosity (IV) dL/g | 0.585 | — | 0.543 | 0.854 | 0.803 | 0.825 | 0.834 | 0.545 0.72 (unprocessed PET) |
| % Silicone grafted Silicone extraction in THF (room temperature/24 h) | Not done | Not done | — | Not done | Not done | Not done | 7% | — |

TABLE 4

Hydrophobicity of Monolayer Films

| Ingredient Name (Wt. %) | Film 1 Comparative | Film 2 Comparative | Film 3 Comparative | Film 4 Inventive | Film 5 Inventive | Control |
|---|---|---|---|---|---|---|
| PET | 90 | 67 | — | 90 | 80 | 100 |
| Comparative MB 1 | 10 | 33 | 100 | — | — | — |
| MB 7 | — | — | — | 10 | 20 | — |
| Total | 100 | 100 | 100 | 100 | 100 | 100 |
| Process Temp | | | | 280° C. | | |
| Wt. % Silicone in Monolayer | 0.3 | 1 | 3 | 1 | 2 | — |
| Surface Energy (Dyne/cm$^2$) | 32 << 38 | 28 | <28 | 28 | <28 | 44 |
| Contact angle θ° (deionized water) | 70° | 77° | 88° | 76° | 81° | 59° |
| Anti-graffiti test (OK/NOK) | NOK | OK | OK | OK | OK | NOK |
| Paint adhesion test (black aerosol paint) | Not done | Not done | Not done | Does not wet on substrate | Does not wet on substrate | Paint wets on substrate |

Reviewing Table 3, both masterbatches MB1 and MB2 had difficulties, without the use of PMDA. MB2 could not be pelletized and the reactive silicone readily exuded out of the extrusion die. Moreover, the intrinsic viscosity of comparative MB1 was found to be too low for use in bioaxially-oriented polyethylene terephthalate (BOPET) film and thermoformed sheet where specifications are, respectively, in the range of 0.6-0.7 dL/g and 0.7-1.00 dL/g. For this reason, masterbatch MB1 is comparative for both Table 3 and Table 4 experimentation.

Masterbatch MB3 was pre-mix of polyester resin and the chain extender for use in preparation of Inventive Masterbatches MB4-MB7.

In the presence of PMDA as chain extender, the level of silicone usage was tested from 3% to 10%. The higher level of grafting can be explained by the reaction which takes place between the anhydride chain extender and the epoxy functionalized silicone. Moreover, PMDA is known to be an efficient chain extender for PET. It is not a surprising result to see how the IV value can be leveraged to 0.8.

But if the amount of PMDA content is too high in the PET as seen in preparative masterbatch MB3, the IV value dropped to below 0.6 dL/g. This limit for the amount of PMDA in polyester confirms that the appropriate concentration of PMDA as a chain extender in PET should be in the range of 0.5-1.0% w/w.

Table 4 reported usage of Comparative MB1 and Inventive MB7. The resulting surface energy and the water contact angle of the films varied with the amount of silicone grafted in the PET.

Table 4 showed film characteristics look the same whatever the mode of addition of silicone grafted PET MB: the levels of silicone were equivalent in Film 2 (though made from unacceptable MB1 for IV reasons) and Film 4 and resulting properties are the same (contact angle and surface energy) Above 1% w/w of silicone in the PET film, the surface property of the film become more and more hydrophobic. With a ratio of 3% w/w of silicone in the film, the surface properties of the hydrophobic polyester film are equivalent to polypropylene (PP) films. Such imparted hydrophobicity confers to the PET film, anti-graffiti properties when the silicone concentration exceeds 1 wt. % in the resulting film.

It is contemplated that films made from Inventive Masterbatches MB4-MB6 will be suitable if their let down is high enough such that the silicone concentration exceeds 1 wt. % in the resulting film, at least 33% for MB4, at least 20% for MB5, and at least 15% for MB6.

Table 5 shows the recipes and processing conditions for Masterbatches MB8 and MB9. Table 6 shows the recipes and processing conditions for Films 6 and 7.

TABLE 5

Tests with α,ω-carbinol difunctional polydimethylsiloxane

| Ingredient Name (Wt. %) | MB8 Inventive | Control | MB9 Inventive |
|---|---|---|---|
| RAMA PET184 | 88.75 | 100 | 88.75 |
| PMDA | 0.75 | | 0.75 |
| BAYSILONE OF OH 702E | 10.00 | | 10.00 |
| Cobalt stearate | 0.50 | | 0.50 |
| Total | 100.00 | | 100.00 |

Processing

| | | | |
|---|---|---|---|
| Mixing Equipment | Twin screw extruder ZE25A * 60D | | |
| Mixing Temp. | 30/150/280/280/280/280/280/280/280/280/280/280° C. | | 30/270/270/250/250/250/250/250/250/250/250/250/250° C. |
| Mixing Speed | 600 rpm | | 300 rpm |
| Order of Addition of Ingredients | PMDA/Co stearate side fed at 18D/ Silicone injected at 20D | No additive | PMDA/Co stearate side fed at 18D/ Silicone injected at 20D |
| Form of Product After Mixing | Pellet | Pellet | Pellet |
| Intrinsic Viscosity (IV) dL/g | 0.481 | 0.545 0.72 (unprocessed PET) | 0.67 |
| % Silicone grafted Silicone extraction in THF (room temperature/24 h) | 10% | — | 10% |

TABLE 6

Hydrophobicity of Monolayer Films

| Ingredient Name (Wt. %) | Film 6 Inventive | Film 7 Inventive | Control Film |
|---|---|---|---|
| PET | 70 | 30 | 100 |
| MB 8 | 30 | 70 | — |
| Total | 100 | 100 | 100 |

TABLE 6-continued

Hydrophobicity of Monolayer Films

| Processing | | | |
|---|---|---|---|
| Process Temp | 280° C. | | |
| % Silicone in Monolayer | 3% | 7% | 0 |
| Surface Energy (Dyne/cm$^2$) | <28 | <28 | 44 |
| Water Contact Angle θ° (deionized water) | 78° | 80° | 59° |
| Paint adhesion (Black aerosol paint) | Does not wet on substrate | Does not wet on substrate | Paint wets on substrate |

With an equivalent level of silicone (10% wt. silicone incorporated), the silicone modified PET MB (MB8) obtained with α,ω-carbinol difunctional polydimethylsiloxane presented a higher proportion of silicone grafted in comparison with silicone modified PET MB (MB7) obtained with α,ω-epoxy difunctional polydimethylsiloxane. The higher level of grafting promoted PET film composition with higher level of silicone and thus higher level of hydrophobicity. In MB8, it is clear that PMDA helps to incorporate the functionalized silicone into the polyester more than in MB 4-7, rather than increasing IV. While a lower IV for MB8 could be an issue, nonetheless, by means of processing alterations known to those skilled in the art, such as by altering the screw configuration, the screw speed, and the processing temperatures, or combinations of them, the IV value can be increased to about 0.6 dL/g, which is acceptable. As seen in MB9, the IV value was increased to 0.67 dL/g by processing alterations of the same formulation as MB8.

A PET extrusion process can be actually hampered by free reactive silicone oil, which has not been chemically bonded to the polyester backbone. The silicone oil can actually act as a lubricant in the extruder. This situation can be traduced by a decrease of the extrusion throughput capacity of the machine. For instance, concentration of MB7 had been limited to 30% during cast film extrusion trials, whereas no limitation was observed with MB8. PET films up to 70% of MB8 have been produced on the cast film production line.

Paint does not adhere at all on the PET film of the invention, which contained the chemically modified PET masterbatch. Once the graffiti has been dried, the PET films 6 and 7 (with chemically modified PET MB8) were less sensitive to ethyl acetate, which is used to remove the graffiti, than the virgin PET film itself.

The invention is not limited to the above embodiments. The claims follow.

What is claimed is:

1. A masterbatch, comprising:
   (a) polyethylene terephthalate carrier;
   (b) α,ω-difunctional polydimethylsiloxane, wherein the α,ω-difunctional polydimethylsiloxane is present in a range of 3 to 10 weight percent of the masterbatch;
   (c) a chain extender of pyromellitic dianhydride, wherein the chain extender is present in a range of 0.5 to 1.0 weight percent of the masterbatch; and
   (d) optionally, other additives comprising a catalyst.

2. The masterbatch of claim 1, wherein the ingredients by weight percent of the masterbatch are listed in the chart below:

| Polyester Terephthalate Carrier | 80%-99% |
|---|---|
| Catalyst | 0.1%-2% |
| Other optional additives | 0%-10%. |

3. The masterbatch of claim 1, wherein the α,ω-difunctional polydimethylsiloxane comprises epoxy-functional siloxanes or carbinol-functional siloxanes.

4. A hydrophobic polyester compound comprising the masterbatch of claim 1 and polyethylene terephthalate resin.

5. An enhanced hydrophobic polyester compound comprising:
   (a) polyethylene terephthalate matrix and
   (b) a hydrophobic polyester masterbatch of claim 1.

6. The polyester compound of claim 5, wherein the α,ω-difunctional polydimethylsiloxane of the masterbatch comprises epoxy-functional siloxanes or carbinol-functional siloxanes.

7. The polyester compound of claim 5, wherein the amount of masterbatch is between about 10% to about 20% of the weight percent of the polyester compound.

8. The polyester compound of claim 5, wherein the additive is selected from the group consisting of anti-blocking agents; adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; silanes, titanates and zirconates; stabilizers; stearates; ultraviolet light absorbers; viscosity regulators; waxes; and combinations of them.

9. The polyester compound of claim 5, in the shape of an injection molded plastic article, an extruded plastic article, a calendered plastic article, a blow molded plastic article, or a thermoformed plastic article.

10. A film having at least one layer comprised of the polyester compound of claim 5.

11. A laminate of the film of claim 10, wherein there is more than one film layer, and wherein each layer comprises same or different ingredients.

12. The laminate of claim 11, wherein there is a skin layer contacting one surface of a core layer; wherein the core layer also has an opposing surface; and wherein the skin layer has a thickness between about 0.5 micrometers and about 1 millimeter.

13. The laminate of claim 12, further comprising a second skin layer contacting the opposing surface of the core layer, wherein the core layer comprises polyester resin without the masterbatch.

14. The film of claim 10, wherein the compound in the form of a film has a Water Contact Angle according to ASTM D7490-08 at least about 30 percent higher as compared with a film of the same polyester without the masterbatch.

15. The film of claim 14, wherein the Water Contact Angle is at least 76°.

16. The film of claim 14, wherein the Water Contact Angle is at least 78°.

17. The film of claim 14, wherein the Water Contact Angle is at least 80°.

18. The film of claim 14, wherein the Water Contact Angle is at least 81°.

19. A fiber comprised of the polyester compound of claim 5.

* * * * *